US011510024B2

United States Patent
Patel et al.

(10) Patent No.: US 11,510,024 B2
(45) Date of Patent: Nov. 22, 2022

(54) SYSTEM AND METHOD FOR GEO-FENCING OF FIXED WIRELESS ACCESS

(71) Applicant: Verizon Patent and Licensing Inc., Basking Ridge, NJ (US)

(72) Inventors: Samirkumar Patel, Middlesex, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/100,197

(22) Filed: Nov. 20, 2020

(65) Prior Publication Data
US 2022/0167114 A1    May 26, 2022

(51) Int. Cl.
*H04W 4/02* (2018.01)
*H04W 4/021* (2018.01)
*H04W 48/02* (2009.01)

(52) U.S. Cl.
CPC ........... *H04W 4/021* (2013.01); *H04W 48/02* (2013.01)

(58) Field of Classification Search
CPC .............................. H04W 4/021; H04W 48/02
USPC ....................................................... 455/456.1
See application file for complete search history.

(56) References Cited

U.S. PATENT DOCUMENTS

| | | | | |
|---|---|---|---|---|
| 2011/0201365 A1* | 8/2011 | Segura | .................... | H04W 4/70 455/466 |
| 2013/0103419 A1* | 4/2013 | Beaudry | .................. | G08B 1/08 705/3 |
| 2014/0022920 A1* | 1/2014 | Dua | ....................... | G01S 13/765 370/252 |
| 2018/0184381 A1* | 6/2018 | Van Hamersveld | ......................... | H04W 52/0216 |
| 2020/0120724 A1* | 4/2020 | Vaidya | .................. | H04W 8/265 |

* cited by examiner

*Primary Examiner* — Joel Ajayi

(57) ABSTRACT

A method, device, and non-transitory computer-readable medium provide for provisioning a geo-fence for a fixed wireless access (FWA) device installed at a designated service address to enable an end device to access network services via a first radio access network (RAN); determining a location of the FWA device relative to the geo-fence based on signaling from the end device; managing the access to the network service for the network session based on a determination of the FWA device's location relative to the geo-fence; and generating instructions related to the managing of the access to the network services.

20 Claims, 7 Drawing Sheets

SYSTEM AND METHOD FOR GEO-FENCING OF FIXED WIRELESS ACCESS

BACKGROUND INFORMATION

Residential, business, and public spaces may implement a Layer 2 and/or Layer 3 local area network (LAN) that enables connectivity for user equipment (UE) to broadband Internet or other large-scale public networks over a radio access network (RAN). For example, a customer location may be served by customer premises equipment (CPE) that includes a fixed wireless access (FWA) device(s) from a network service provider. The FWA device(s) may connect to, or alternatively may also function as, a WiFi access point (AP) that provides short-range wireless access for the CPE and/or UE devices. Each UE device (e.g., as a mobile user device) may have its own service profile and may connect to broadband Internet via an air interface (e.g., the RAN) using the CPE, e.g., the FWA device(s). Typically, FWA device setup and connection involve selecting installation sites so as to satisfy service requirements that are specified for UE devices, for example, in an applicable service level agreement (SLA).

DETAILED DESCRIPTION OF EXAMPLE EMBODIMENTS

Figure 1:
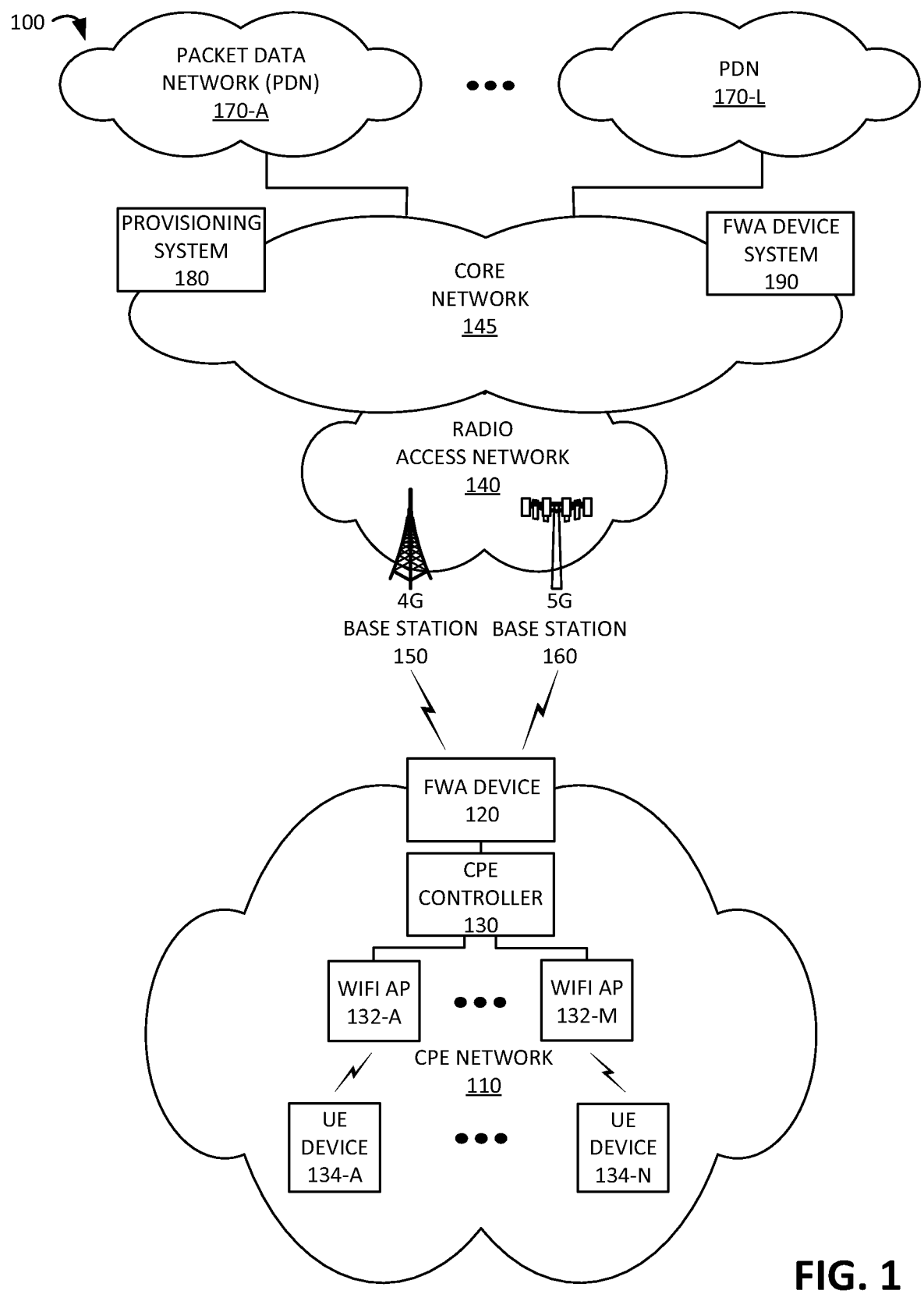
FIG. 1 is a diagram illustrating an environment according to an implementation described herein.

The following detailed description refers to the accompanying drawings. The same reference numbers in different drawings identify the same or similar elements. The following detailed description does not limit the invention, which is defined by the claims.

To make broadband wireless available to individual customers via the various air interfaces (e.g., 5G New Radio (NR)), service providers may deploy fixed wireless access (FWA) devices for accessing broadband services, such as Internet service that includes Voice over Internet Protocol (VoIP), video streaming, live gaming, Internet browsing, etc. Thus, instead of a wired electrical connection (e.g., a coaxial cable connected to a wireless router or set-top-box, etc.) or an optical connection (e.g., an optical network terminal (ONT) connected to an optical fiber, etc.), an FWA device may connect the customer to a provider network via one or more base stations using wireless (or radio) signals.

An FWA device may be installed in a designated service location at the customer premises of a customer, such as a residence, a place of business, an office complex, etc. In order to provide guaranteed service levels of broadband service for each customer, a service provider may need to prequalify, coordinate, and/or manage the number of UE devices in a given coverage area which are allowed access to network services. For example, due to limited radio resources available at each coverage area, a service provider may desire to operationalize FWA devices only when located within their respective designated service locations. However, current FWA systems and standards do not provide a technological solution to the challenge of restricting access to network resources in this manner.

Implementations described herein relate to a service provider establishing geo-fencing for a designated service location for an FWA device, outside of which the service provider may apply additional control of access to network services. For example, network services may be disabled entirely or in part, and/or bandwidth throttled according to terms and conditions for the provided services. In some implementations, device-centric techniques are used for acquiring location information of an end device to compare against the applicable geo-fencing. In other implementations, the network-centric techniques are used for acquiring location information of an end device to compare against the applicable geo-fencing.

In other implementations, geo-fencing may be provisioned for the FWA services to control the customer's access to network services based on the designated service location. In some implementations, the geo-fencing may correspond to a geographic location of varying granularity corresponding to, for example, GPS data obtained for the UE device and/or FWA device, secure user plane location (SUPL) data obtained for the UE device and/or FWA device, LTE positioning protocol annex (LPPa) data obtained for the UE device and/or FWA device, etc. In other implementations, the geo-fencing may correspond to a geographic location associated with a cell sector that is identified by a cell ID such as an extended Cell Global Identifier (eCGI) or NR Cell Global Identifier (NCGI). In other implementations, the geo-fencing may correspond to a geographic location associated with a tracking area that is identified by a Tracking Area Identifier (TAI) that may include a PLMN ID and a Tracking Area Code (TAC).

Implementations described herein relate to provisioning geo-fencing corresponding to a geographic location of a UE device with respect to a subscriber profile ID (SPID) for the eNB and/or a SPID for pre-identified gNB. In yet other implementations, the geo-fencing may correspond to a geographic location associated with an operator-defined protocol configuration option (PCO) for the eNB and/or the SPID for pre-identified gNB.

FIG. 1 is a diagram of an exemplary environment 100 in which the systems and/or methods, described herein, may be implemented. As shown in FIG. 1, environment 100 may include a customer premises equipment (CPE) network 110, a radio access network (RAN) 140, a core network (145), packet data networks (PDNs) 170-A to 170-L (referred to herein collectively as "PDNs 170" and individually as "PDN 170"), a provisioning system 180, and an FWA device system 190.

CPE network 110 may include a Layer 2 and/or Layer 3 local area network (LAN) associated with a customer's premises. For example, CPE network 110 may be located at or in a residence, an apartment complex, a school campus, an office building, a shopping center, a connected mass transit vehicle (e.g., bus, train, plane, boat, etc.), and/or in another type of location associated with a customer of a service provider. CPE network 110 may request/receive one or more data services via a wireless connection between FWA device 120 and PDN 170, such as, for example, a video streaming service, an Internet service, and/or a voice communication (e.g., phone) service. CPE network 110 may be implemented as a gigabit network that enables gigabit speed connections. CPE network 110 may include FWA device 120, a CPE controller 130, WiFi access points (APs) 132-A to 132-M (referred to herein collectively as "WiFi APs 132" and individually as "WiFi AP 132"), and UE devices 134-A to 134-N (referred to herein collectively as "UE devices 134" and individually as "UE device 134").

FWA device 120 may be installed in a designated service location at, or near, the customer premises, such as outside of a structure (e.g., on a roof, attached to an exterior wall, etc.) or inside a structure (e.g., next to a window or another structural feature with lower radio signal attenuation properties). FWA device 120 may be configured to connect to RAN 140 and communicate with elements of core network 145. FWA device 120 may be configured to communicate via a 4G LTE air interface and/or a 5G NR air interface. FWA device 120 may be configured to operate within or proximate to the customer service address that is designated by the service provider.

CPE controller 130 may include a network device configured to function as a switch and/or router for devices in CPE network 110. CPE controller 130 may connect devices in CPE network 110 to FWA device 120. CPE controller 130 may include a layer 2 and/or layer 3 network device, such as a switch, a router, an extender, a repeater, a firewall, and/or gateway and may support different types of interfaces, such as an Ethernet interface, a WiFi interface, a Multimedia over Coaxial Alliance (MoCa) interface, and/or other types of interfaces. CPE controller 130 may further manage WiFi APs 132 and/or UE devices 134 connected to WiFi APs 132.

WiFi AP 132 may include a transceiver configured to communicate with UE devices 134 using WiFi. WiFi AP 132 may enable UE devices 134 to communicate with each other and/or with FWA device 120 via CPE controller 130. WiFi AP 132 may connect to CPE controller 130 via a wired connection (e.g., an Ethernet cable). Furthermore, WiFi APs 132 may include one or more Ethernet ports for connecting UE devices 134 via a wired Ethernet connection. In some implementations, FWA device 120 may include, and/or perform the functions of, CPE controller 130 and/or WiFi AP 132. Other types of access points and/or short-range wireless devices may be implemented.

UE device 134 may include a device that connects to a particular WiFi AP 132 using WiFi wireless signals. For example, UE device 134 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. UE device 134 may be used for voice communication, mobile broadband services (e.g., video streaming, real-time gaming, premium Internet access etc.), best effort data traffic, and/or other types of applications.

As another example, UE device 134 may correspond to an embedded wireless device that communicates wirelessly with like devices over an M2M interface using MTC and/or another type of M2M communication. As an example, UE device 134 may be electrically connected or coupled to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a controller of an electronic sign (e.g., an electronic billboard, etc.), a controller of a manufacturing system (e.g., a robot arm, an assembly line, etc.), a controller of a security system (e.g., a camera, a motion sensor, a window sensor, etc.), a controller of a power system (e.g., a smart grid monitoring device, a utility meter, a fault diagnostics device, etc.), a controller of a financial transaction system (e.g., a point-of-sale terminal, a vending machine, a parking meter, etc.), and/or another type of electronic device.

RAN 140 may provide access to PDN 170 for wireless devices, such as FWA device 120. RAN 140 may enable FWA device 120 to connect to PDN 170 for mobile telephone service, Short Message Service (SMS) message service, Multimedia Message Service (MMS) message service, Internet access, cloud computing, and/or other types of data services. RAN 140 may establish or may be incorporated into a PDN connection between FWA device 120 and PDN 170 via one or more access point names (APNs). For example, RAN 140 may establish an Internet Protocol (IP) connection between FWA device 120 and PDN 170. Furthermore, RAN 140 may enable FWA device 120 to communicate with an application server, and/or another type of device, located in PDN 170 using a communication method that does not require the establishment of an IP connection between FWA device 120 and PDN 170, such as, for example, Data over Non-Access Stratum (DoNAS).

In some implementations, RAN 140 may include a Long Term Evolution (LTE) access network. In other implementations, RAN 140 may include a Code Division Multiple Access (CDMA) access network. For example, the CDMA access network may include a CDMA enhanced High Rate Packet Data (eHRPD) network (which may provide access to an LTE access network).

Furthermore, RAN 140 may include a 5G access network and/or an LTE Advanced (LTE-A) access network or other advanced network that includes functionality such as carrier aggregation; advanced or massive multiple-input and multiple-output (MIMO) configurations (e.g., 8×8, 16×16, 256× 256, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, RAN 140 may include a 4G base station 150 (e.g., an evolved Node B (eNB)) and a 5G base station 160 (e.g., a next generation Node B (gNB)). 4G base station 150 and 5G base station 160 may each include one or multiple cells that include devices and/or components configured to enable radio communication with FWA devices 120. For example, each cell may include a radio frequency (RF) transceiver facing a particular direction. 4G base station 150 may be configured to communicate with FWA device 120 using a 4G LTE air interface. 5G base station 160 may be configured to communicate with FWA device 120 using a 5G NR air interface. For example, 5G base station 140 may include one or more antenna arrays configured to send and receive radio signals, for example, in the mm-wave frequency range, in the sub-6 gigahertz frequency range, and/or another radio frequency range.

Core network 145 may be managed by a provider of data communication services and may manage data sessions of users connecting to core network 145 via RAN 140. For example, core network 145 may establish an IP connection between UE devices 134 and PDN 170. In some implementations, core network 145 may include a 5G core network. Exemplary components of a 5G core network are described below with reference to FIG. 2.

In other implementations, core network 145 may include a 4G LTE core network (e.g., an evolved packet core (EPC) network). An EPC network may include devices that implement network functions that include a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PDN gateway (PGW); a PGW that functions as a gateway to a particular PDN 170; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information, such as whitelisted eNBs. Exemplary components of a 4G core network are described in detail below with reference to FIG. 3.

PDN 170 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. PDN 170 may allow the delivery of IP services to FWA device 120, and may interface with other external networks. PDN 170 may include one or more server devices and/or network devices, or other types of computation or communication devices. In some implementations, PDN 170 may include an IP Multimedia Sub-system (IMS) network (not shown in FIG. 1) or other types of application layer networks. An IMS network may include a network for delivering IP multimedia services and may provide media flows between FWA device 120 and external IP networks or external circuit-switched networks (not shown in FIG. 1).

Provisioning system 180 may include one or more devices, such as computer devices, server devices, and/or databases which manage/store service profiles for UE devices 134 and/or FWA devices 120. For example, provisioning system 180 may identify designated service locations (e.g., physical address, geographic area (latitude, longitude, and/or altitude), etc.) at which FWA device 120 may operate in a network session, as well as SLA information. Furthermore, provisioning system 180 may include information relating to geo-fencing of FWA device 120. For example, provisioning system 180 may obtain information relating to the nodes of an allowed data transport network from FWA device 120, such as 4G base station 150, 5G base station 160, RAN 140, etc.

FWA device system 190 may include one or more devices, such as computer devices and/or server devices, which manage various aspects of the functionality of FWA device 120 and/or UE device 134 according to the applicable service profile. For example, FWA device system 190 may maintain a database of parameters relating to geo-fencing established by a service provider, and/or may perform diagnostics and/or analytics with respect to UE device 134. For example, for each FWA device 120, FWA device system 190 may store information relating to the designated service location of FWA device 120 and/or the cell sectors served by 4G base station 150 and/or 5G base station 160, information relating to IDs associated with UE devices 134, FWA device 120, 4G base station 150 and/or 5G base station 160, information relating to whitelists identifying 4G base station 150 and/or 5G base station 160, and/or other types of information associated with 4G base station 150 and/or 5G base station 160.

Furthermore, FWA device system 190 may manage an FWA device application associated with FWA device 120. For example, an FWA device application may reside on UE device 134, such as a customer's smart phone, and UE device 134 may execute the FWA device application to communicate via FWA device 120. For example, FWA device system 190 may provide information relating to one or multiple geo-fencing parameters to UE device 134 and UE device 134 may use the information for establishing network connections via FWA device 120.

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
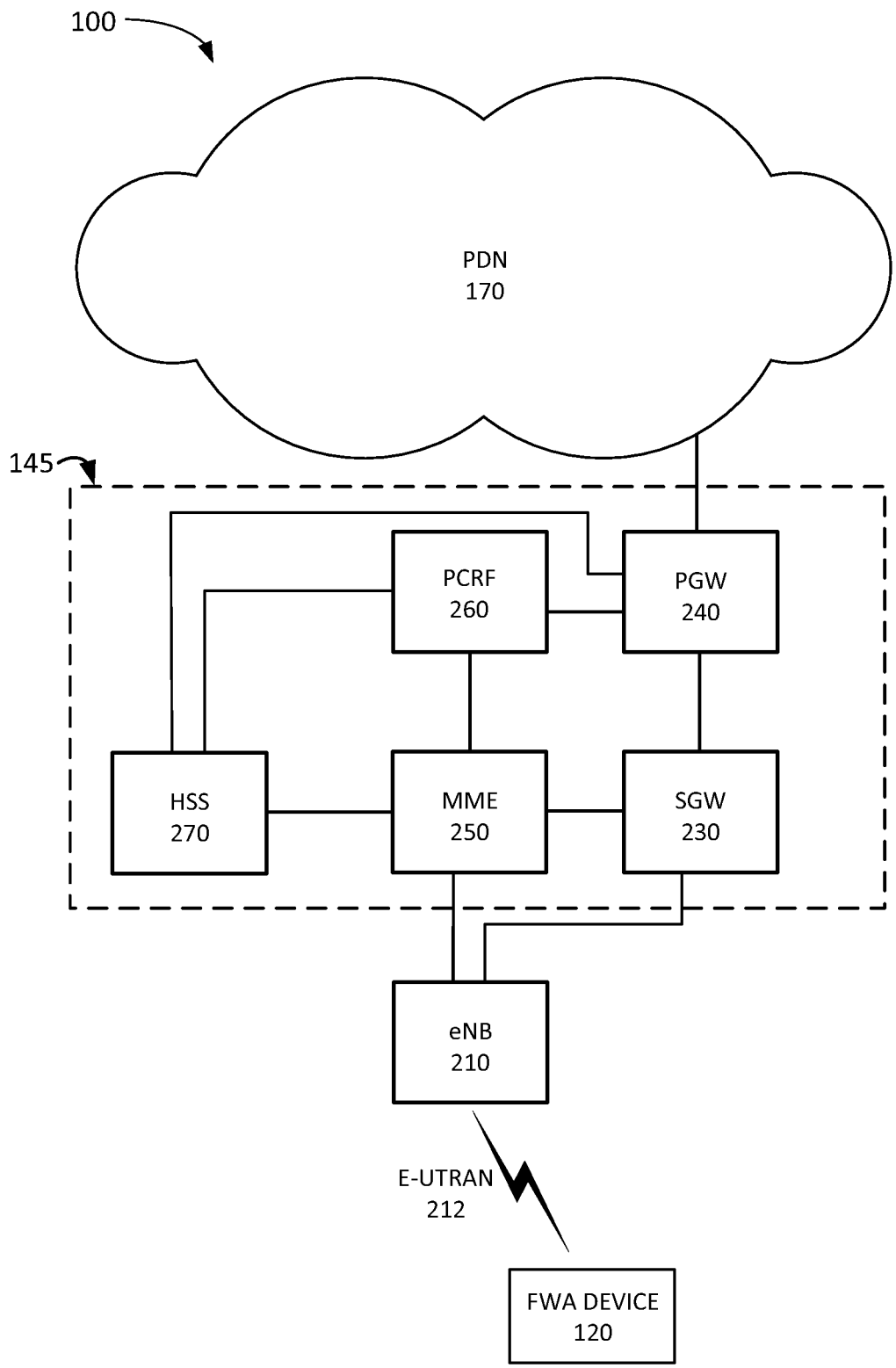
FIGS. 2 and 3 are diagrams illustrating exemplary components of the environment of FIG. 1.

FIG. 2 is a diagram illustrating exemplary components of core network 145 in the context of environment 100 according to an implementation described herein. As shown in FIG. 2, core network 145 may include eNB 210, a Serving Gateway (SGW) 230, a PGW 240, an MME 250, a PCRF device 260, and HSS 270. While FIG. 2 depicts a single eNB 210, a single SGW 230, a single PGW 240, a single MME 250, a single PCRF device 260, and a single HSS 270, for illustration purposes, in practice, core network 140 may include multiple eNBs 210, multiple SGWs 230, multiple PGWs 240, multiple MMES 250, multiple PCRF devices 260, and/or multiple HSSs 270.

eNB 210 may correspond to 4G base station 150. eNB 210 may communicate with FWA device 120 using a 4G LTE air interface referred to as an Evolved Universal Mobile Telecommunications System (UMTS) Terrestrial Radio Access Network (E-UTRA) interface 212. eNB 210 may interface with core network 145 via an interface that may include both a control plane interface and a data plane interface with MME 250 and/or SGW 230 and may be implemented, for example, with a protocol stack that includes a Non-Access Stratum (NAS) protocol and/or Stream Control Transmission Protocol (SCTP).

SGW 230 may provide an access point to and from FWA device 120, may handle forwarding of data packets for FWA device 120, and may act as a local anchor point during handover procedures between RANs 140. SGW 230 may interface with PGW 240 and may function as a gateway to PDN 170. A particular FWA device 120, while connected to a single SGW 230, may be connected to multiple PGWs 240, one for each packet network with which FWA device 120 communicates. For example, a particular PGW 240 may be associated with a particular APN and FWA device 120 may connect to the particular APN by connecting to PGW 240 associated with the particular APN. Thus, FWA device 120 may be connected to one or multiple APNs at a time.

MME 250 may implement control plane processing for core network 145. For example, MME 250 may implement tracking and paging procedures for FWA device 120, may activate and deactivate bearers for FWA device 120, may authenticate a user of FWA device 120, and may interface to non-LTE radio access networks. A bearer may represent a logical channel with particular quality of service (QoS) requirements. MME 250 may also select a particular SGW 230 for a particular FWA device 120. A particular MME 250 may interface with other MMEs 250 (not shown in FIG. 2) in core network 145 and may send and receive information associated with FWA devices 120, which may allow one MME 250 to take over control plane processing of FWA devices 120 serviced by another MME 250, if the other MME 250 becomes unavailable. Furthermore, MME 250 may manage non-IP communication with FWA device 120 using NAS.

MME 250 may communicate with SGW 230 via an interface that may be used to create and manage a new session for a particular FWA device 120. For example, the interface may be activated when MME 250 needs to communicate with SGW 230, such as when the particular FWA device 120 attaches to or registers with core network 145, when bearers need to be added or modified for an existing session for the particular FWA device 120, when a connection to a new PGW 240 needs to be created, or during a handover procedure (e.g., when the particular FWA device 120 needs to switch to a different SGW 230).

PCRF device 260 may implement policy and charging rules functions, such as establishing QoS requirements, setting allowed bandwidth and/or data throughput limits for particular bearers and/or FWA devices 120, determining charges for a particular service for a FWA device 120, and/or other types of policy or charging rules. PCRF device 260 may communicate with PGW via an interface.

HSS 270 may store subscription information associated with FWA devices 120 and/or information associated with users of FWA devices 120. For example, HSS 270 may store subscription profiles that include authentication, access, and/or authorization information. Each subscription profile may include information identifying FWA device 120, authentication and/or authorization information for FWA device 120, services enabled and/or authorized for FWA device 120, device group membership information for FWA device 120, and/or other types of information associated with FWA device 120. HSS 270 may communicate with MME 250 via an interface and with PCRF device 260 and with PGW 240 via other interfaces.

Although FIG. 2 show exemplary components of core network 140, in other implementations, core network 145 may include fewer components, different components, differently arranged components, or additional components than depicted in FIG. 2. Additionally, or alternatively, one or more components of core network 145 may perform functions described as being performed by one or more other components of core network 140.

Figure 3:
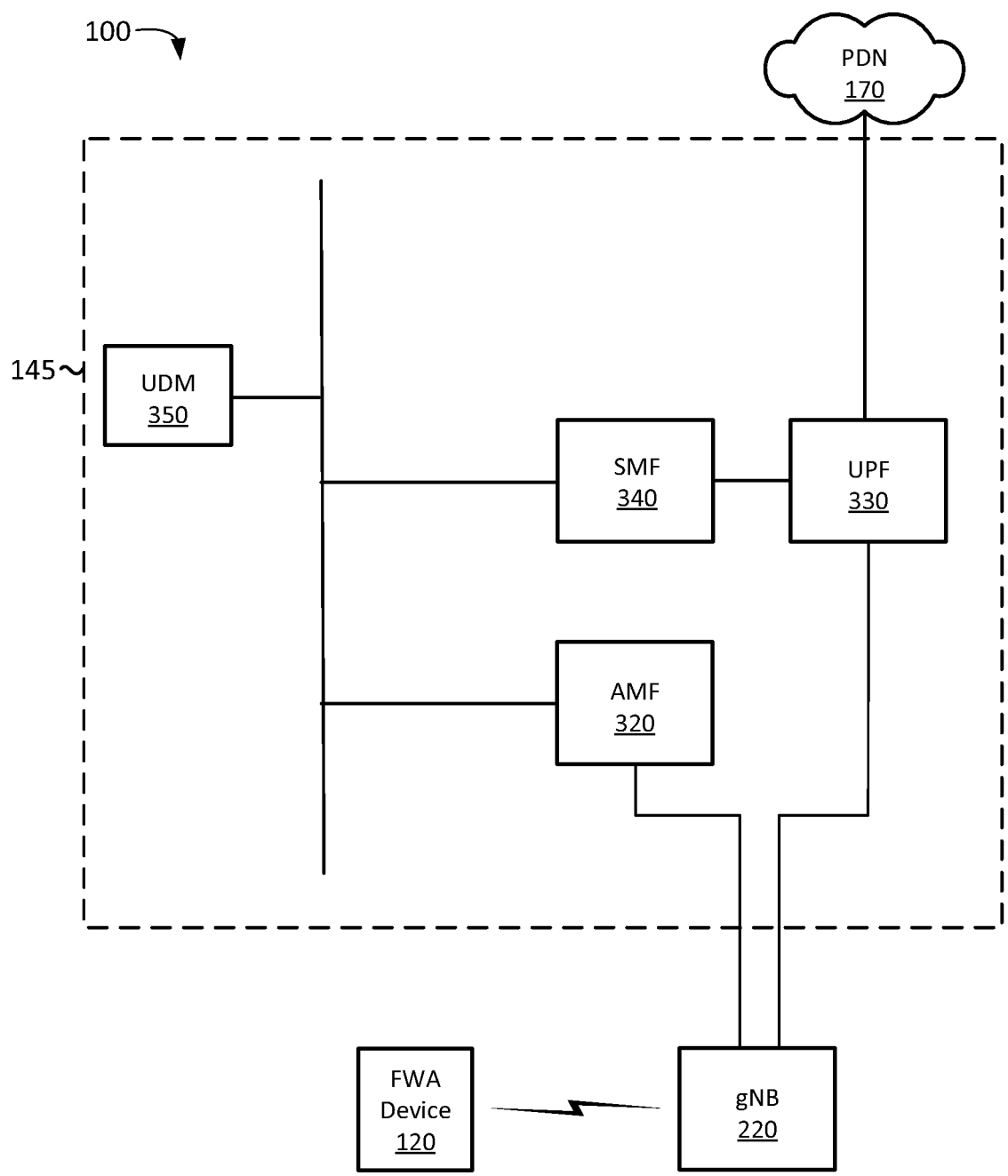

FIG. 3 illustrates another exemplary implementation of components of core network 145. As shown in FIG. 3, environment 100 may include FWA device 120, gNB 220, core network 145, and PDN 170. Core network 145 may include an Access and Mobility Function (AMF) 320, a User Plane Function (UPF) 330, a Session Management Function (SMF) 340, and a Unified Data Management (UDM) 350. While FIG. 3 depicts a single AMF 320, UPF 330, SMF 340, and UDM 350, for illustration purposes, in practice, core network 145 may include multiple AMFs 320, UPFs 330, SMFs 340, and UDMs 350. gNB 220 may be part of RAN 140 and may include base station 160. Exemplary components of gNB 220 are describe below with reference to FIG. 3.

AMF 320 may perform registration management, connection management, reachability management, mobility management, lawful intercepts, Short Message Service (SMS) transport between FWA device 120 and one or more function nodes of core network 145, session management messages transport between FWA device 120 and one or more function nodes of core network 145, access authentication and authorization, location services management, functionality to support non-3GPP access networks, and/or other types of management processes. AMF 320 may be accessible by other function nodes of core network 145.

UPF 330 may maintain an anchor point for intra/inter-RAT mobility, maintain an external Packet Data Unit (PDU) point of interconnect to a particular PDN 170 (e.g., an IMS network, a mobile private network (MPN), etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB 220), and/or perform other types of user plane processes. UPF 230 may communicate with SMF 240 and connect to PDN 170 via an interface.

SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward one or more node functions of core network 145, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data.

UDM 350 may maintain subscription information for FWA devices 120 and/or UE devices 134, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 350 may store, in a subscription profile associated with a particular UE device 134, a list of network slices which the particular UE device 134 is allowed to access.

Although FIG. 3 shows exemplary components of core network 145, in other implementations, core network 145 may include fewer components, different components, differently arranged components, or additional components than depicted in FIG. 3. Additionally, or alternatively, one or more components of core network 145 may perform functions described as being performed by one or more other components of core network 145. For example, core network 145 may include additional function nodes not shown in FIG. 3, such as a Unified Data Repository (UDR), an Unstructured Data Storage Network Function (UDSF), a Location Management Function (LMF), a Lawful Intercept Function (LIF), a Binding Session Function (BSF), an Application Function (AF), a Policy Control Function (PCF), a Charging Function (CHF), a Network Repository Function (NRF), a Network Exposure Function (NEF), a Network Slice Selection Function (NSSF), an Authentication Server Function (AUSF), a 5G Equipment Identity Register (EIR), a Network Data Analytics Function (NWDAF), a Short Message Service Function (SMSF), a Security Edge Protection Proxy (SEPP), a Non-3GPP Inter-Working Function (N3IWF) 374, and/or other types of functions. Furthermore, core network 145 may include a reference point architecture that includes point-to-point interfaces between particular function nodes.

Figure 4:
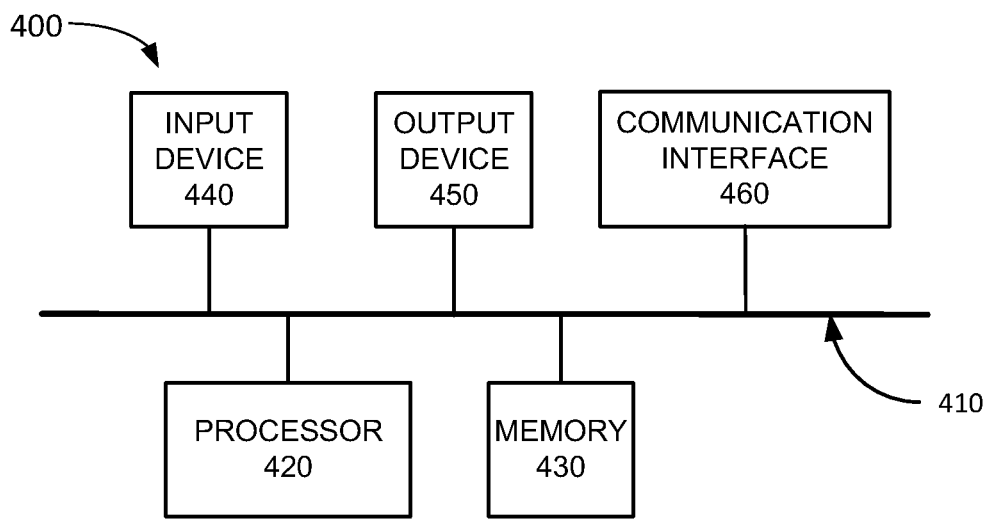
FIG. 4 is a diagram illustrating exemplary components of a device that may be included in a device of FIGS. 1-3.

FIG. 4 is a diagram illustrating example components of a device 400 according to an implementation described herein. FWA device 120, CPE controller 130, WiFi Ap 132, UE device 134, 4G base station 150, 5G base station 160, eNB 210, gNB 220, SGW 230, PGW 240, MME 250, PCRF 260, HSS 270, AMF 320, UPF 330, SMF 340, and UDM 350 may each include, or be implemented on, one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some implementations, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the user. In some implementations, device 500 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to the geo-fencing of an FWA system. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 500 may include fewer components, different components, additional components, or differently arranged components than depicted in FIG. 4. Additionally, or alternatively, one or more components of device 400 may perform one or more tasks described as being performed by one or more other components of device 400.

Figure 5:
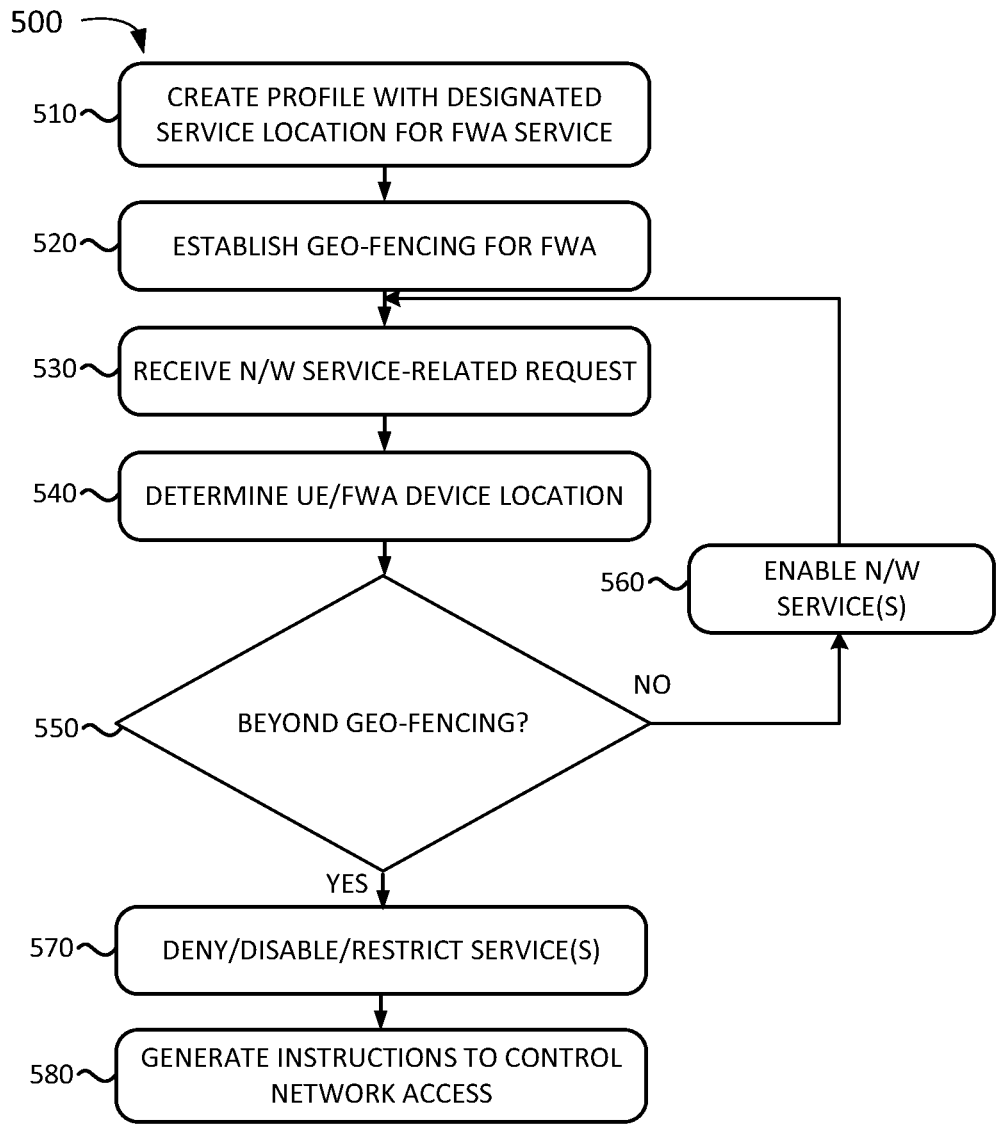
FIG. 5 is a flowchart of a process for geofencing of an FWA device according to an implementation described herein.

FIG. 5 is a flowchart of a process 500 for geo-fencing an FWA device (e.g., FWA device 120) according to an implementation described herein. In some implementations, process 500 may be performed by function nodes of core network 145. In other implementations, some or all of process 500 may be performed by another device or a group of devices associated with CPE network 110 and/or another device or a group of devices associated with PDN 170.

Process 500 may include creating a user profile and/or a UE device profile associated with FWA device 120 (block 510). As an example, a user may subscribe to a service provider's FWA services at a designated service location. In the registration process, in some implementations, provisioning system 180 of the service provider may provision network access to services in accordance with terms and conditions for an FWA device at a customer premises' physical address.

Geo-fencing may be provisioned for the FWA services to control the customer's access to network services based on the designated service location (block 520). In some implementations, provisioning system 180 and/or one or more network nodes of core network 145 may provision the geo-fencing to correspond to a geographic location of varying granularity corresponding to, for example, GPS data obtained for FWA device 120, secure user plane location (SUPL) data obtained for FWA device 120, LTE positioning protocol annex (LPPa) data obtained for FWA device 120, etc. In other implementations, the geo-fencing may correspond to a geographic location associated with a cell sector that is identified by a cell ID such as an eCGI or NCGI. In other implementations, the geo-fencing may correspond to a geographic location of a tracking area that is identified by a Tracking Area Identifier (TAI) that may include a PLMN ID and a Tracking Area Code (TAC). A PLMN ID may include a Mobile Country Code (MCC) and a Mobile Network Code (MNC). In other implementations, as described below with reference to FIG. 6, the geo-fencing may correspond to a geographic location associated with a subscriber profile ID (SPID) for eNB 150 and/or a SPID for a pre-identified gNB 160. In yet other implementations, the geo-fencing may correspond to a geographic location associated with an operator-defined protocol configuration option (PCO) for eNB 150 and/or a PCO for gNB 160 identified in a whitelist or other data structure. In some implementations, any combination of the geo-fencing described herein may be used in establishing one or multiple geo-fences for serving a customer's FWA system.

A network service-related request may be received with an included FWA ID associated with FWA device 120 to eNB 210 or gNB 220 (block 710). For example, at power-up, UE device 134 may generate an attach request message or a registration request message to RAN 140 which may forward the request to node in core network 145, such as MME 250 (or AMF 320/SMF 340). Alternatively or additionally, during a network session, UE device 134 may generate a tracking area update (TAU) request message to RAN 140 which may forward the request to MME 250 (or AMF 320/SMF 340). Alternatively or additionally, the message may be any other type of service request from UE device 134 to MME 250 (or AMF 320/SMF 340) during a network session.

In response to the network service-related request, one or more nodes in core network 145, such as MME 250 (or AMF 320/SMF 340), may determine a location of FWA device 120 (block 540). As an example, MME 250 (or AMF 320/SMF 340) and/or HSS 270 (or UDM 350) may use one or multiple types of data and/or one or multiple procedures to determine a location from which the network service-related request was sent.

The location information for FWA device 120 may be compared to geo-fencing parameters established for FWA device 120 and a determination made as to whether FWA device 120 is operating outside of the geo-fencing (block 550). As an example, MME 250 (or AMF 320/SMF 340) may compare GPS data, SUPL data, LPPa data, cell ID data, eCGI data, and/or TAC data, to geographic parameters for the established geo-fencing defined in the subscriber profile associated with FWA 120. As another example, MME 250 (or AMF 320/SMF 340) may compare eNB 210 or gNB 220 identification information associated with the network-service related request with the whitelisted eNBs/gNBs for the SPID and/or the PCO associated with the network-service related request.

When it is determined that FWA device 120 is operating within the applicable geo-fencing (block 550—NO), MME 250 (or AMF 320/SMF 340) may grant the request, for example, by completing the attach or registration procedures, enabling the requested network service(s), and process 500 may return to block 530 to wait for further requests from UE device 134 via FWA device 120. Alternatively, when it is determined that FWA device 120 is operating beyond the applicable geo-fencing (block 550—YES), MME 250 (or AMF 320/SMF 340) may deny the request and/or disable the requested network service(s) or throttle data service to UE device 134 and/or FWA device 120 (block 570) and may issue instructions to control network access to UE device 134 and/or FWA device 120 (block 580). In other embodiments, one or more of the operations described above may be performed by one or more of SGW 230, PCRF 260 and/or UPF 330.

Figure 6:
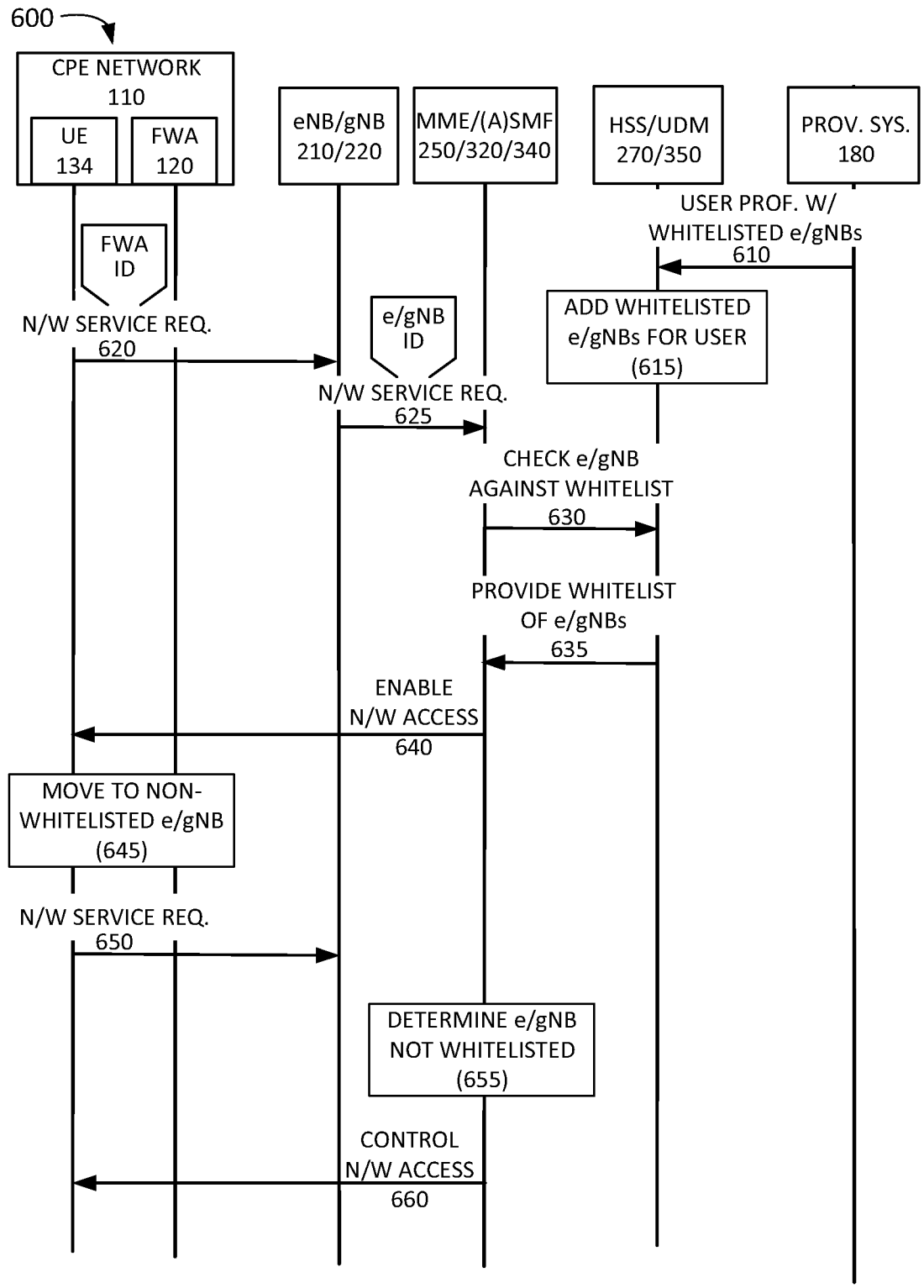
FIGS. 6 and 7 illustrate exemplary messaging and operations for provisioning geo-fencing for a UE device and/or an FWA device according to an implementation described herein.

FIG. 6 illustrates a first exemplary messaging and operations of a signal flow 600 for configuring geo-fencing for FWA device 120 according to an implementation described herein. Signal flow 600 illustrates an implementation in which SPID and/or PCO information associated with UE device 134 and/or FWA device 120 is used to determine where FWA device 120 are located relative to applicable geo-fencing. Signal flow 600 may include provisioning system 180 assigning a subscriber (or service) profile identifier (SPID) that identifies services associated with FWA device 120 and/or UE devices 134 (signal 610). Additionally, the SPID may be referenced to whitelisted eNBs 150 and/or gNBs 160. As another example, the whitelisted eNBs 150 and/or gNBs 160 may be associated with an operator-defined PCO. HSS 270 (or UDM 350) may store whitelisted eNBs 150 and/or gNBs 160 for a user associated with UE device 134 and/or FWA device 120 (block 615).

Signal flow 600 may include UE device 134 sending a network service-related request via FWA device 120 to eNB 150 (or gNB 160) (signal 620). For example, UE device 134 may generate and send an attach or registration request to RAN 140 which may include an FWA ID. In some implementations, the attach or registration request may include a request for operator-defined PCO values. When UE device 134 is already attached to or registered with RAN 140, the network service-related request may be a TAU, or any other service request related to a network session. eNB 150 (or gNB 160) may forward the network service-related request, including an ID identifying eNB 150 (or gNB 160) to MME 250 (or AMF 320/SMF 340) (signal 625).

MME 250 (or AMF 320/SMF 340) may check with HSS 270 (or UDM 350) to determine whether the eNB 150 (or gNB 160) is listed in the corresponding whitelist (signal 630). For example, MME 250 (or AMF 320/SMF 340) may forward the ID identifying eNB 150 (or gNB 160) to HSS 270 (or UDM 350) to determine whether eNB 150 (or gNB 160) is within geo-fencing established for FWA device 120. In response, HSS 270 (or UDM 350) may provide the whitelist of eNBs 150 (or gNBs 160), proved for FWA device 120, to MME 250 (or AMF 320/SMF 340) (signal 635).

Assuming that MME 250 (or AMF 320/SMF 340) determines that eNB 150 (or gNB 160) is located within geo-fencing established for FWA device 120, MME 250 (or AMF 320/SMF 340) may enable network access to UE device 134 (signal 640). For example, the attach or registration procedures may be completed for connecting UE device 134 to RAN 140, or the TAU procedures completed. In some implementations, MME 250 (or AMF 320/SMF 340) may add PCO values to an accept message or the like in response to the network service-related request.

Referring to the example illustrated in FIG. 6, UE device 134 and/or FWA device 120 may relocate to another eNB 150 (or gNB 160) (block 645), and generate a network service-related request (signal 650), for example, an attach or registration request to eNB 150 (or gNB 160). In response to the request, MME 250 (or AMF 320/SMF 340) may determine that eNB 150 (or gNB 160) is not a whitelisted eNB 150 (or gNB 160) for FWA dev ice 120 (block 655). MME 250 (or AMF 320/SMF 340) may issue instructions controlling access to the network (signal 660). For example, the attach or registration request may be denied, bandwidth may be restricted, a bearer may be torn down, etc., according to policies associated with a service profile for FWA device 120.

Figure 7:
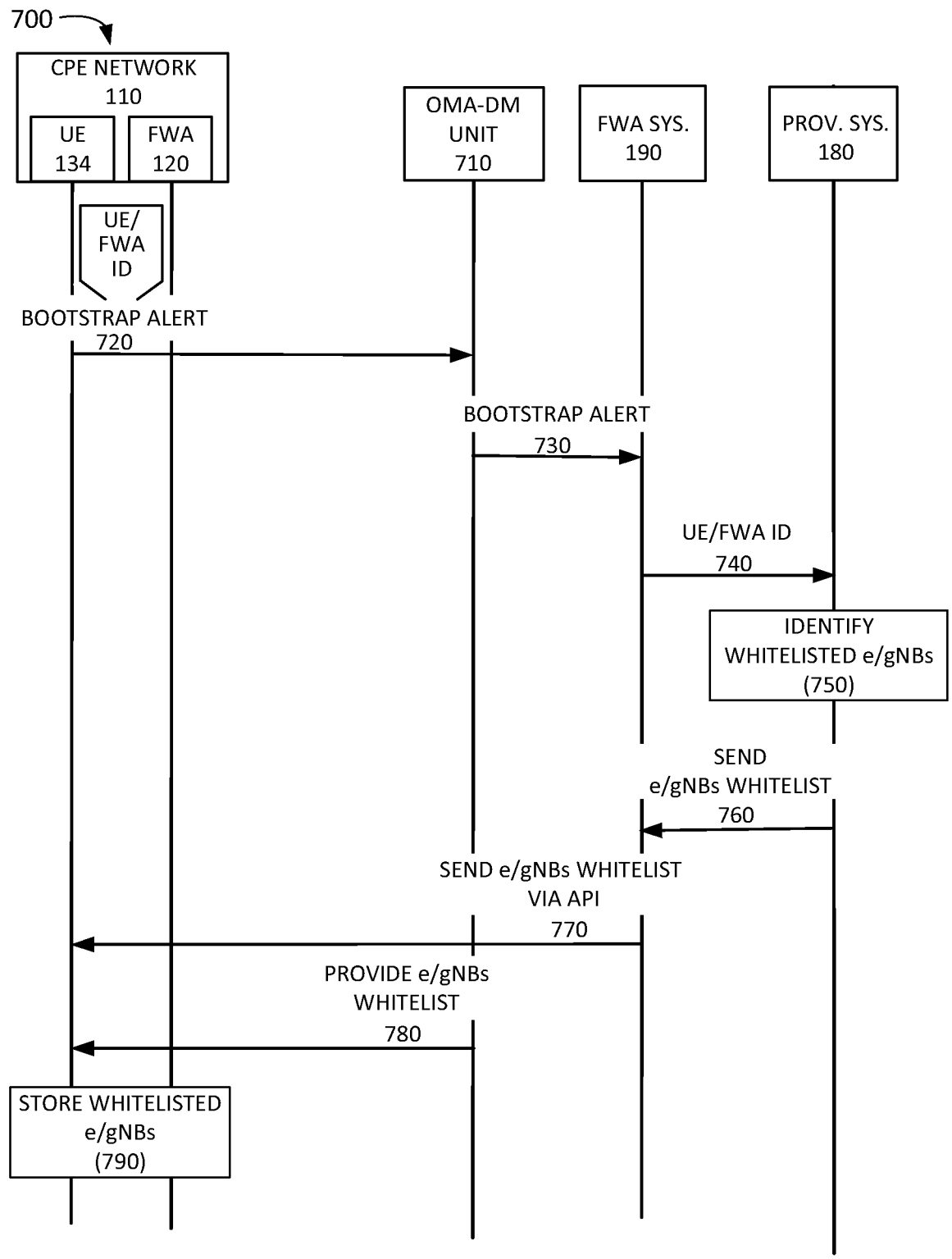

FIG. 7 illustrates another exemplary messaging and operations of a signal flow 700 for configuring geo-fencing for FWA device 120 according to an implementation described herein. Signal flow 700 illustrates an implementation in which a Cell ID, an NCGI, and/or an eCGI associated with UE device 134 and/or FWA device 120 is used to determine where FWA device 120 is located relative to applicable geo-fencing. Signal flow 700 may include UE device 134, upon power-up, generating and sending via FWA device 120, a bootstrap alert message including device identification information (signal 730). For example, a mobile directory number (MDN), an International Mobile Equipment Identity (IMEI), and/or an International Mobile Subscriber Identity (IMSI) associated with UE device 134 and/or FWA device 120 may be included in the bootstrap alert to an Open Mobile Alliance (OMA) device management (DM) unit 710 that may be a function node of core network 145 or, alternatively, may connect to core network 145. OMA-DM unit 705 may forward the bootstrap alert to FWS system 190 (signal 730).

Signal flow 700 may include FWA system 190 forwarding the identification information (e.g., MDN, IMEI, IMSI, etc.) associated with UE device 134 and/or FWA device 120 to provisioning system 180 (signal 740). Based on the identification information, provisioning system 180 may identify whitelisted eNBs 150 (or gNBs 160) that service the designated service location (block 750). Provisioning system 180 may send the whitelist to FWA system 120 (signal 760).

FWA system 190 may send the whitelist to UE device 134 and/or FWA device 120 via an application programming interface (API) (signal 770). Additionally, or alternatively, OMA-DM 710 may send the whitelist to UE device 134 and/or FWA device 120 (signal 780). UE device 134 and/or FWA device 120 may store the whitelist (block 790). Subsequently, when UE device 134 connects to RAN 140 via FWA device 120, UE device 134 may consult the whitelist to determine whether the network connection is to a whitelisted eNB 150 (or gNB 160) and thus within the applicable geo-fencing, or not, in which case the network connection may be disabled or redirected, for example, to a particular web portal, and/or data usage associated with requested network services may be restricted and/or bandwidth throttled.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 5, and series of messaging and operations have been described with respect to FIGS. 6 and 7 the order of the blocks and/or messaging/operations may be modified in other implementations. Further, non-dependent blocks may be performed in parallel.

Some implementations described herein relate to systems and methods for provisioning geo-fencing configurations of varying geographic location granularities for an FWA system. In some implementations, a selection may be made to apply, for example, the most restrictive (e.g., smallest) geo-fencing based on the most reliable location information that may be obtained for the UE device and/or FWA device for which network services are requested. In other implementations, other criteria may be used to which of the provisioned geofences are to be applied for a particular network session. In this manner, a service provider may control the amount of data usage related to FWA devices relative to their designated service locations.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
provisioning, by a network function (NF) node of a core network, fixed geographic parameters of a geo-fence for a fixed wireless access (FWA) device for a service address to enable an end device to access a network service via the FWA device and a first radio access network (RAN), wherein the FWA device is non-stationary relative to the fixed geographic parameters and to a coverage area of the first RAN, and wherein the FWA device communicates with the end device via an established connection;
determining, by the NF node, a location of the FWA device relative to the fixed geographic parameters of the geo-fence based on signaling from the end device;
restricting, by the NF node, the access to the network service for a network session based on the location of the FWA device being beyond the fixed geographic parameters of the geo-fence and not based on a location of the end device relative to the fixed geographic parameters of the geo-fence; and
generating, by the NF node, instructions to the FWA device related to the restricted access to the network service by the end device via the established connection that the end device maintains with the FWA device, wherein the instructions identify an action selected from among sets of actions including:
denying an attach request, a registration request, or a tracking area update (TAU) request received by the first RAN from the end device,
tearing down a bearer between the first RAN and the end device, or
disabling the network service or throttling bandwidth for the network service.

2. The method of claim 1, wherein the first RAN comprises a next generation Node B (gNB) and the NF node comprises an Access and Mobility Function (AMF).

3. The method of claim 1, wherein the first RAN comprises a next generation Node B (gNB) and the NF node comprises a Session and Mobility Function (SMF).

4. The method of claim 1, wherein determining the location of the FWA device comprises using an Evolved Universal Terrestrial Radio Access Network (E-UTRAN) cell global identifier (ECGI) or New Radio cell global identifier (NCGI) associated with the signaling, and identifying the first RAN or a RAN other than the first RAN based on the ECGI or the NCGI.

5. The method of claim 1, wherein determining the location of the FWA device comprises determining from the signaling a geographic location of the end device, and
wherein the signaling includes at least one of global positioning system (GPS) data, secure user plane location (SUPL) based data, or Long Term Evolution (LTE) Positioning Protocol annex (LPPa) data.

6. The method of claim 1, wherein provisioning the geo-fence comprises setting one or more parameters of the geo-fence based on network loading information for one or more coverage areas associated with at least one of the first RAN and a second RAN.

7. The method of claim 1, wherein determining the location of the FWA device comprises using a tracking area code (TAC) associated with the signaling, and identifying the first RAN or a RAN other than the first RAN based on the TAC.

8. The method of claim 1, wherein determining the location of the FWA device comprises using a subscriber profile identifier (SPID) associated with the signaling, and identifying the first RAN or a RAN other than the first RAN based on the SPID.

9. The method of claim 1, further comprising:
determining that the signaling is received via the first RAN or via a RAN other than the first RAN, and
providing, when the signaling is received via the first RAN, protocol configuration option (PCO) values for accessing the network service.

10. The method of claim 1, further comprising:
generating location information corresponding to the geo-fence; and
presenting, via a user interface of the end device, the location information indicating an area in which the end device is permitted to be operationalized.

11. A network function (NF) node of a core network comprising:
a processor configured to:
provision fixed geographic parameters of a geo-fence for a fixed wireless access (FWA) device installed at a designated service address to enable an end device to access a network service via a wireless interface between the FWA device and a first radio access network (RAN), wherein the FWA device is non-stationary relative to the fixed geographic parameters and to a coverage area of the first RAN, and wherein the FWA device communicates with the end device via an established connection;
determine a location of the FWA device relative to the fixed geographic parameters of the geo-fence based on signaling from the end device;
restrict the access to the network service for a network session based on the location of the FWA device being beyond the fixed geographic parameters of the geo-fence and not based on a location of the end device relative to the fixed geographic parameters of the geo-fence; and
generate instructions to the FWA device related to the restricted access to the network service by the end device via the established connection that the end device maintains with the FWA device, wherein the instructions identify an action selected from among sets of actions including:

denying an attach request, a registration request, or a tracking area update (TAU) request received by the first RAN from the end device, tearing down a bearer between the first RAN and the end device, or disabling the network service or throttling bandwidth for the network service.

12. The NF node of claim 11, wherein the first RAN comprises a next generation Node B (gNB) and the NF node comprises an Access and Mobility Function (AMF).

13. The NF node of claim 11, wherein the first RAN comprises a next generation Node B (gNB) and the NF node comprises a Session and Mobility Function (SMF).

14. The NF node of claim 11, wherein determining the location of the FWA device comprises using an Evolved Universal Terrestrial Radio Access Network (E-UTRAN) cell global identifier (ECGI) or New Radio cell global identifier (NCGI) associated with the signaling, and identifying the first RAN or a RAN other than the first RAN based on the ECGI or the NCGI.

15. The NF node of claim 11, wherein determining the location of the FWA device comprises determining from the signaling a geographic location of the end device, and wherein the signaling includes at least one of global positioning system (GPS) data, secure user plane location (SUPL) based data, or Long Term Evolution (LTE) Positioning Protocol annex (LPPa) data.

16. The NF node of claim 11, wherein determining the location of the FWA device comprises using a tracking area code (TAC) associated with the signaling, and identifying the first RAN or a RAN other than the first RAN based on the TAC.

17. The NF node of claim 11, wherein determining the location of the FWA device comprises using a subscriber profile identifier (SPID) associated with the signaling, and identifying the first RAN or a RAN other than the first RAN based on the SPID.

18. The NF node of claim 11, wherein the processor is further configured to:

determine that the signaling is received via the first RAN or via a RAN other than the first RAN, and provide, when the signaling is received via the first RAN, protocol configuration option (PCO) values for accessing the network service.

19. A non-transitory, computer-readable storage medium storing instructions executable by a processor of a computational device, which when executed cause the computational device to:

provision fixed geographic parameters of a geo-fence for a fixed wireless access (FWA) device installed at a designated service address to enable an end device to access a network service via a wireless interface between the FWA device and a first radio access network (RAN), wherein the FWA device is non-stationary relative to the fixed geographic parameters and to a coverage area of the first RAN, and wherein the FWA device communicates with the end device via an established connection;

determine a location of the FWA device relative to the fixed geographic parameters of the geo-fence based on signaling from the end device;

restrict the access to the network service for a network session based on the location of the FWA device being beyond the fixed geographic parameters of the geo-fence and not based on a location of the end device relative to the fixed geographic parameters of the geo-fence; and generate instructions to the FWA device related to the restricted access to the network service by the end device via the established connection that the end device maintains with the FWA device, wherein the instructions identify an action selected from among sets of actions including:

denying an attach request, a registration request, or a tracking area update (TAU) request received by the first RAN from the end device, tearing down a bearer between the first RAN and the end device, or disabling the network service or throttling bandwidth for the network service.

20. The non-transitory computer-readable medium of claim 19, further comprising instructions to:

determine that the signaling is received via the first RAN or via a RAN other than the first RAN, and provide, when the signaling is received via the first RAN, protocol configuration option (PCO) values for accessing the network service.

\* \* \* \* \*